(12) United States Patent
Fan (10) Patent No.: US 10,410,588 B2
(45) Date of Patent: Sep. 10, 2019

(54) DISPLAY METHOD OF MULTI-PRIMARY COLOR GRAPHENE DISPLAY DEVICE

(71) Applicant: Shenzhen China Star Optoelectronics Technology Co., Ltd., Shenzhen (CN)

(72) Inventor: Yong Fan, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 3 days.

(21) Appl. No.: 15/328,518

(22) PCT Filed: Jan. 5, 2017

(86) PCT No.: PCT/CN2017/070282
§ 371 (c)(1),
(2) Date: Jan. 24, 2017

(87) PCT Pub. No.: WO2018/082207
PCT Pub. Date: May 11, 2018

(65) Prior Publication Data
US 2018/0336833 A1 Nov. 22, 2018

(30) Foreign Application Priority Data
Nov. 1, 2016 (CN) .......................... 2016 1 0937011

(51) Int. Cl.
*G09G 3/34* (2006.01)
*G02B 1/115* (2015.01)
(Continued)

(52) U.S. Cl.
CPC ............... *G09G 3/34* (2013.01); *G02B 1/115* (2013.01); *G09G 3/32* (2013.01); *G09G 3/3607* (2013.01); *G09G 2340/06* (2013.01)

(58) Field of Classification Search
CPC .......... G09G 3/34; G09G 3/32; G09G 3/3607; G09G 2340/06; G09G 2320/0233; G02B 1/115; H04N 1/6027
See application file for complete search history.

(56) References Cited

U.S. PATENT DOCUMENTS

8,466,856 B2 * 6/2013 Hamer ................ G09G 3/2003
345/76
9,570,040 B2 * 2/2017 Yang ...................... G09G 5/022
(Continued)

*Primary Examiner* — Nitin Patel
*Assistant Examiner* — Amy Onyekaba (57) ABSTRACT

Disclosed is a display method of a multi-primary color sphere display device. The method includes the steps of: dividing a pixel color gamut into color patches; determining a color patch to which a pixel chromaticity coordinate belongs; displaying through three dynamic sub-pixels according to the color patch to which the pixel chromaticity coordinate belongs; and determining output brightness of the dynamic sub-pixels by coordinates of a white point, coordinates of the dynamic sub-pixels, an output brightness value when gray level 255 in red is input, an output brightness value when gray level 255 in green is input, and an output brightness value when gray level 255 in blue is input respectively. When input gray level values of RGB three pixels are approximately the same, output brightness and white chromaticity are basically close to the same, guaranteeing the consistency of the chromaticity coordinates of the white point.

10 Claims, 5 Drawing Sheets

(51) Int. Cl.
   *G09G 3/36*      (2006.01)
   *G09G 3/32*      (2016.01)

(56)            References Cited

U.S. PATENT DOCUMENTS

| | | | |
|---|---|---|---|
| 2003/0095138 A1* | 5/2003 | Kim | G06T 11/001 |
| | | | 345/690 |
| 2005/0031199 A1* | 2/2005 | Ben-Chorin | G09G 5/02 |
| | | | 382/162 |
| 2007/0176862 A1* | 8/2007 | Kurt | G09G 3/2092 |
| | | | 345/82 |
| 2008/0158097 A1* | 7/2008 | Guo | G09G 5/02 |
| | | | 345/55 |
| 2009/0040564 A1* | 2/2009 | Granger | H04N 1/00 |
| | | | 358/2.1 |
| 2010/0225673 A1* | 9/2010 | Miller | G09G 3/2003 |
| | | | 345/690 |
| 2010/0289727 A1* | 11/2010 | Miller | G09G 3/2003 |
| | | | 345/76 |
| 2011/0148910 A1* | 6/2011 | Botzas | G09G 5/02 |
| | | | 345/600 |
| 2011/0149166 A1* | 6/2011 | Botzas | H04N 5/202 |
| | | | 348/649 |
| 2012/0212515 A1* | 8/2012 | Hamer | G09G 3/2003 |
| | | | 345/690 |
| 2015/0054864 A1* | 2/2015 | Choi | G09G 3/2003 |
| | | | 345/694 |
| 2015/0312542 A1* | 10/2015 | Suginohara | G09G 3/2003 |
| | | | 345/603 |

\* cited by examiner

Fig. 1

(Prior Art)

Fig. 2

(Prior Art)

Fig. 3

(Prior Art)

Fig. 4

(Prior Art)

DISPLAY METHOD OF MULTI-PRIMARY COLOR GRAPHENE DISPLAY DEVICE

CROSS-REFERENCE TO RELATED APPLICATIONS

The present application claims the priority of Chinese patent application CN 201610937011.1, entitled "Display method of multi-primary color graphene display device" and filed on Nov. 1, 2016, the entirety of which is incorporated herein by reference.

FIELD OF THE INVENTION

The present disclosure relates to the technical field of graphene display devices, and in particular, to a display method of a multi-primary color graphene display device.

BACKGROUND OF THE INVENTION

Graphene, a hexagonal honeycomb lattice shaped planar film comprising carbon atoms in an $sp^2$ hybridized orbital, is a two-dimensional nanomaterial with a thickness of only one carbon atom, and a material most likely to trigger a new round of revolutions in the field of electronic technology.

With regard to graphene, it has the following features.

1) it is the thinnest but also the hardest nanomaterial in the world currently and is harder than diamonds, and its strength is 100 times higher than that of the best steel in the world;

2) it has excellent light transmission, is almost completely transparent, and only absorbs 2.3% of the light;

3) its greatest characteristic is that the movement speed of electrons therein reaches 1/300 of the speed of light, and far exceeds the movement speed of electrons in general conductors;

4) it is a material with the least resistivity in the world, the thermal conduction coefficient reaches up to 5300 W/m·K, and its electron mobility exceeds 15,000 cm$^2$/(V·s) at ordinary temperature, while the resistivity is only about 10-6 Ω·cm; and 5) its structure is very stable, with the connection between each of carbon atoms being very flexible, and when an external mechanical force is applied, carbon atom planes will suffer from bending deformation, so that the carbon atoms are not required to be rearranged to adapt to the external force, thereby maintaining a stable structure, and enabling the carbon atoms to have excellent electrical conductivity.

Currently, common preparation methods of the graphene material are mechanical exfoliation method, chemical oxidation method, crystal epitaxial growth method, chemical vapor deposition method, organic synthesis method, carbon nanotube peeling method, etc. Samsung and Sungkyunkwan University are using the chemical vapor deposition (CVD) method, by which high-quality graphene can be prepared with a large surface area, but with a high cost and complex process.

With excellent features of hard texture, high transparency (transmittance≈97.7%), high thermal conductivity coefficient (up to 5300 W/(m·K)), high electron mobility (more than 15,000 cm$^2$/(V·s)), and the like, graphene has been increasingly used in display devices in recent years, especially in touch screens (as an alternative to a conventional transparent conductive thin film ITO) and in the aspect of LED.

In recent years, due to the appearance of graphene light-emitting elements, applications of graphene in the display field are expanded. Display units made using a graphene material can change the light-emitting color of graphene light-emitting diodes by adjusting a gate voltage, and its principle is that the size of an electric field generated by the gate voltage can adjust the Fermi level of a semi-reduced graphene oxide, and therefore can adjust a light-emitting wavelength of graphene.

Figure 1:
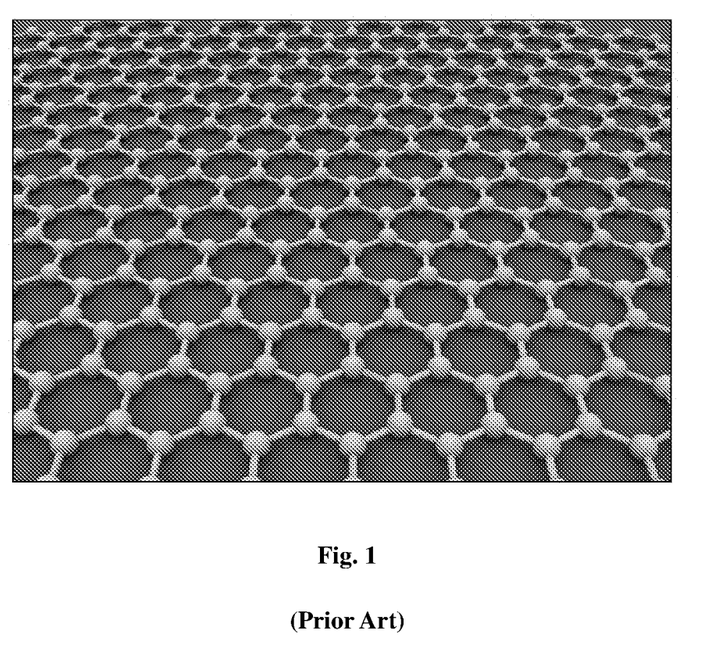
FIG. 1 shows an atomic structure diagram of graphene in the background art.
Figure 2:
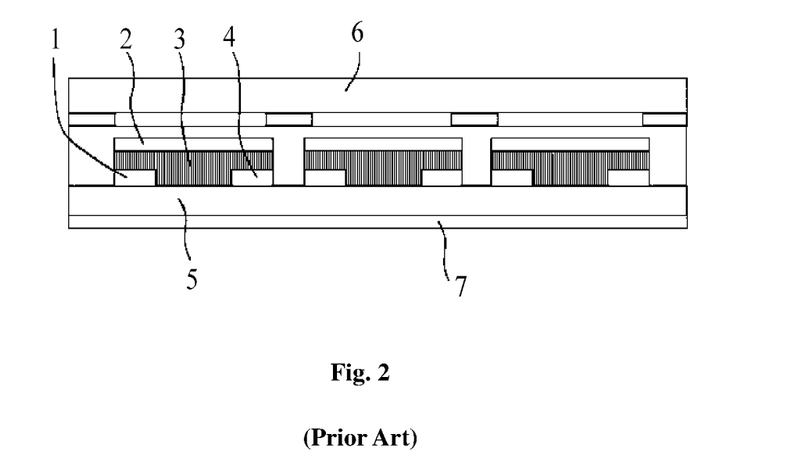
FIG. 2 shows a structural diagram of a display unit of a graphene display device in the background art.

FIG. 2 is a schematic diagram of a display unit of a graphene display device prepared based on a semiconductor graphite oxide light-emitting material, and the display unit of the graphene display device includes an upper substrate, a lower substrate, and light-emitting structures, wherein the number of the light-emitting structures can be provided according to the specific requirements of the graphene display device. Each of the light-emitting structures comprises a light-emitting layer, a gate, a source, and a drain. The gate covers one side surface of the light-emitting layer towards the upper substrate, and the source and the drain are located on one side of the light-emitting layer away from the gate.

The light emitting layer of the display device is a semi-reduced graphene oxide. The source and the drain are a reduced graphene oxide, and the gate is a graphene oxide. One surface of the lower substrate of the display device facing away from the above mentioned structure has a high-reflectance metal reflecting layer. The material of the lower substrate can be a water-insulating oxide-insulating transparent organic material (PET), and can also be glass or nickel or the like, and the upper substrate is a water-insulating oxide-insulating organic material (PET) or glass or the like.

In terms of a graphene display device, the light-emitting layer can emit light with different colors according to differences of gate voltages. For example, when the gate voltage Vgs is between 0 V and 10 V and a source-drain voltage Vds is greater than a startup voltage Vth, graphene emits red light; when Vgs is between 20 V and 30 V and the source-drain voltage Vds is greater than the startup voltage Vth, graphene emits green light; and when Vgs is between 40 V and 50 V and the source-drain voltage Vds is greater than the startup voltage Vth, graphene emits blue light. The intensity of the emitted light can be changed by changing the size of the Vds voltage, and thereby a gray level can be adjusted.

Therefore, each of the light-emitting structures actually constitutes a dynamic pixel. Adjustment of the light emitting color of the light emitting structures can be achieved by controlling the source-drain voltage Vds, and each of the light-emitting structures can emit not only three primary colors of light: red, green, and blue (RGB), but also five primary colors of light: red, green, blue, yellow, and cyan (RGBYC), or even more colors of light. Therefore, a brighter and wider color gamut coverage can be realized; an aperture ratio of a display device can be increased; and the display power consumption can be reduced.

As graphene can use the same light-emitting material to achieve the different light emitting colors, the light emitting colors can be adjusted only by controlling the gate voltage. According to this principle, as few pixel units as possible can be used to achieve a brighter and wider color gamut coverage and a lower power consumption, and to improve the display device aperture ratio.

By utilizing the unique light-emitting characteristic of graphene, traditional RGB 3-primary color pixels are designed into three dynamic sub-pixels, so that a graphene display device that uses only three sub-pixels can achieve the purpose of RGBYC (red-green-blue-yellow-cyan) 5-primary color display; and so-called DDD is dynamic pixels, wherein the selection of dynamic pixel colors is determined by an input RGB signal.

The graphene display device can achieve, by using a drive design of dynamic pixels, RGBYC 5-primary color high color saturation display which can be hardly achieved through traditional LCD display devices. To achieve, with three dynamic sub-pixels of the graphene display device, RGBYC 5-primary color based ultra-wide color gamut display, a pixel color gamut covered by RGBYC is required to be divided, and then three different pixels are selected according to the positions where the colors are located.

Figure 3:
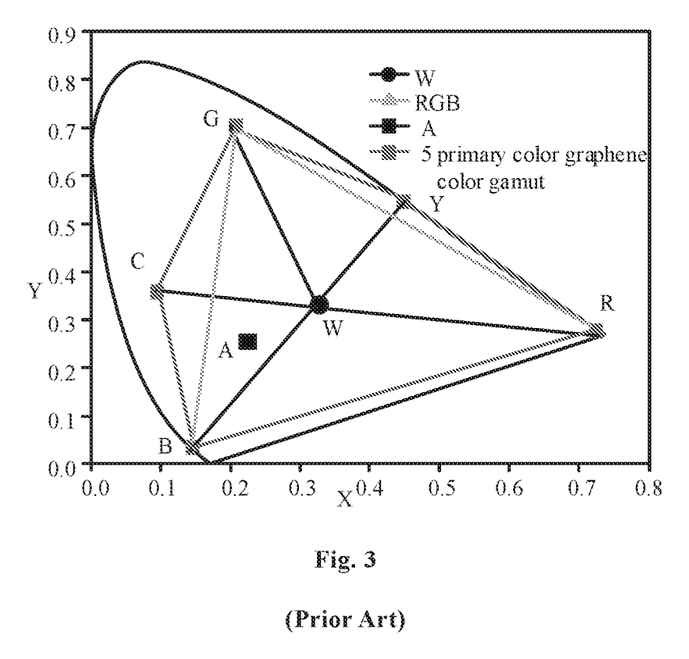
FIG. 3 shows a distribution diagram of a 5-primary color gamut of the graphene display device in a rectangular plane coordinate system in the background art.
Figure 4:
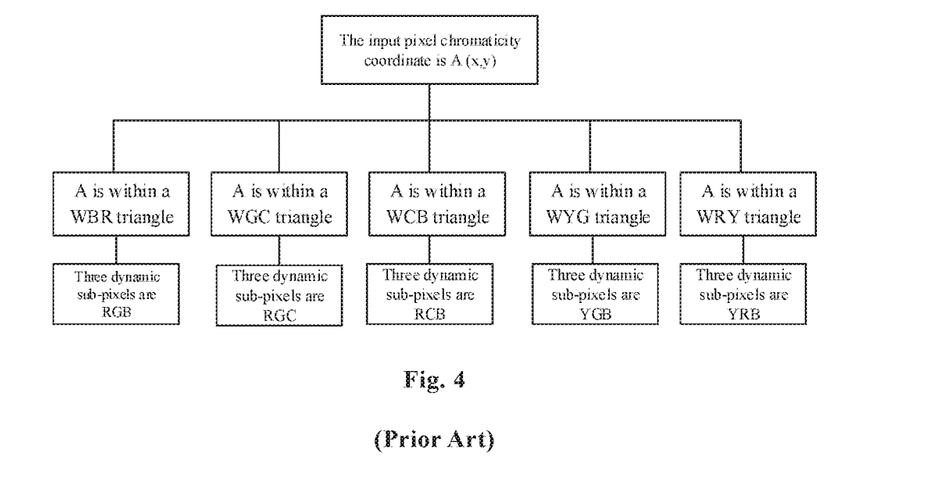
FIG. 4 shows a correspondence diagram of a position of a pixel chromaticity coordinate A (x, y) and display color of a dynamic sub-pixel in the background art.
Figure 5:
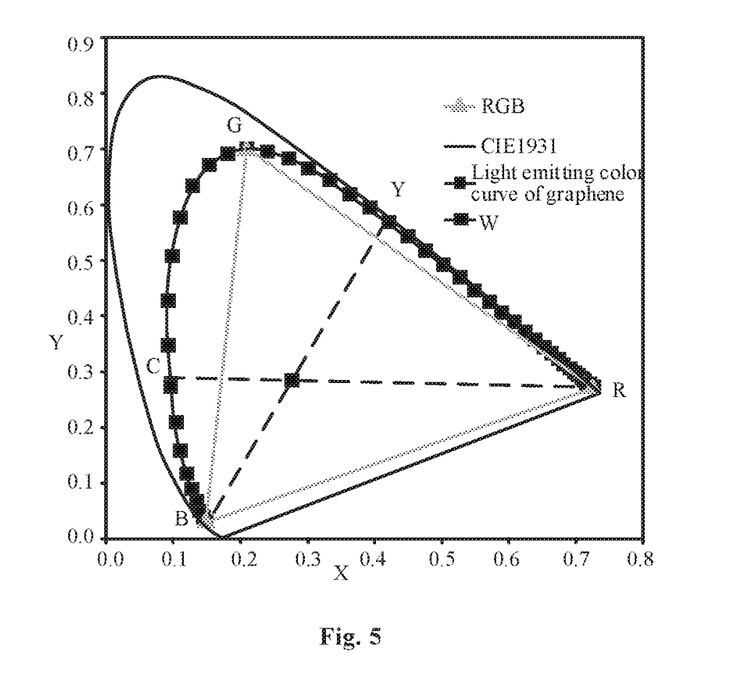
FIG. 5 shows a distribution diagram of a 5-primary color gamut of a graphene display device in a rectangular plane coordinate system in the detailed description of embodiments.
Figure 6:
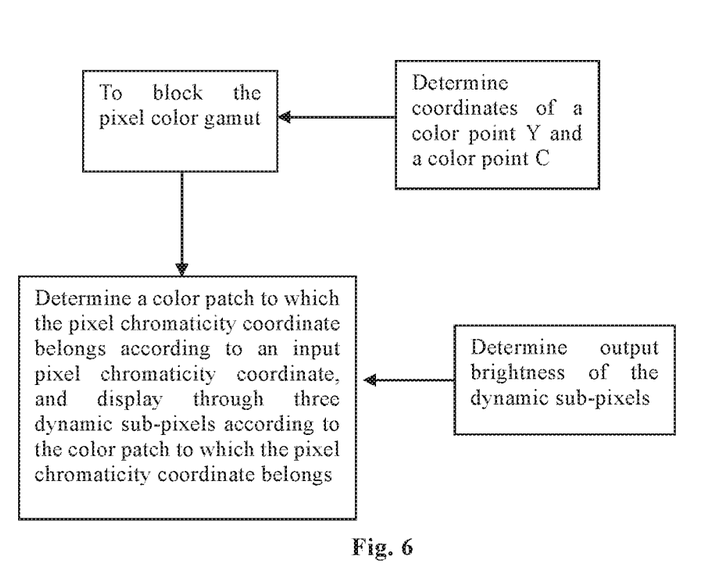
FIG. 6 shows a flow chart of a method for improving the consistency of color coordinates of white points of an RGBYC multi-primary-color graphene display device in the detailed description of embodiments.

As shown in FIG. 3, with a current five color patch dividing method as an example, in a rectangular plane coordinate system, the color gamut where RGBYC is located can be divided into five triangular color patches of WBR, WCB, WGC, WYG, and WRY, the triangular color patches have a predetermined matching relationship with display colors of the dynamic sub-pixels, and each of the triangular color patches has corresponding display colors of the dynamic sub-pixels. The position of a pixel in the pixel color gamut can be determined according to an input pixel chromaticity coordinate A (x, y), and the display colors of three dynamic sub-pixels can be determined according to the position of a pixel in the pixel color gamut. FIG. 4 is a diagram of the correspondence of the position of a pixel chromaticity coordinate A (x, y) and the display color of the dynamic sub-pixel.

The gray levels of the dynamic sub-pixels are determined according to input gray level values RiGiBi of an RGB pixel, and the value of i is in the range from 0 to 255, which represents the gray level value. However, it cannot be guaranteed that when A (x, y) is in any one of the triangular color patches, and the input gray level value signals of an RGB 3-color signal are close to the same, the output luminance is substantially close to the white color chromaticity. That is to say, the consistency of the color coordinates of white points is poor.

SUMMARY OF THE INVENTION

Aimed at the above-mentioned problems in the prior art, the present application provides a display method of a multi-primary color graphene display device.

The display method of a multi-primary color graphene display device of the present disclosure comprises the steps of:

dividing a pixel color gamut to form a plurality of different color patches;

determining, according to an input pixel chromaticity coordinate, a color patch to which the pixel chromaticity coordinate belongs;

displaying through three dynamic sub-pixels according to the color patch to which the pixel chromaticity coordinate belongs, each color patch corresponding to display colors of the three dynamic sub-pixels; and determining output brightness of the dynamic sub-pixels by coordinates of a white point, coordinates of the dynamic sub-pixels, an output brightness value when gray level 255 in red is input, an output brightness value when gray level 255 in green is input, and an output brightness value when gray level 255 in blue is input.

In the present disclosure, in order to make an RGBYC 5-primary color graphene display device have a good consistency of the chromaticity coordinates of the white point, a color point Y and a color point C are defined, so that the color point Y is an intersection point of an extension line of a connection line of a color point B and a color point W with a light emitting color curve of graphene, and the color point C is an intersection point of an extension line of a connection line of a color point R and the color point W with the light emitting color curve of graphene.

In the present disclosure, in a rectangular plane coordinate system, the color gamut where RGBYC is located can be divided into five triangular color patches of WBR, WCB, WGC, WYG, and WRY, and the triangular color patches have a predetermined matching relationship with display colors of the dynamic sub-pixels, each of the triangular color patches having corresponding display colors of the dynamic sub-pixels.

A position of a pixel in a pixel color gamut can be determined according to an input pixel chromaticity coordinate A (x, y), and the display colors of the three dynamic sub-pixels can be determined according to the position of a pixel in the pixel color gamut.

The three dynamic sub-pixels are utilized to achieve an ultra-wide color gamut display of RGBYC 5 primary colors, so that the display has a high color saturation, and the number of the sub-pixels is reduced at the same time, thereby improving aperture ratio of the display device.

In the present disclosure, when the dynamic sub-pixels are RGC or RCB, output brightness of the point R and that of the point C meet the following formula:

$$LRg(255)+LCg(255)=LRi(255)+LGi(255)+LBi(255) \quad (1)$$

$$X_w=[(XRg \times LRg/YRg)+(XCg \times LCg/YCg)]/(LRg/YRg+LCg/YCg) \quad (2)$$

$$Y_w=(LRg+LCg)/(LRg/YRg+LCg/YCg) \quad (3)$$

wherein Xw and Yw are horizontal and vertical coordinates of the point W respectively; LRi (255), LGi (255), and LBi (255) are respectively an output brightness value when gray level 255 in red is input, an output brightness value when gray level 255 in green is input, and an output brightness value when gray level 255 in blue is input; XRg and YRg are horizontal and vertical coordinates of the point R respectively; XCg and YCg are horizontal and vertical coordinates of the point C respectively; LCg (255) is a brightness value of gray level 255 output by the point C; and LRg (255) represents a brightness value of gray level 255 output by the point R.

In the present disclosure, when the dynamic sub-pixels are RGC, $$LGg(255)=a*LGi(255),$$

wherein LRg (255) is the brightness value of gray level 255 output by the G point, and 0.5<a<2.

Preferably, 1≤a≤1.3.

The most preferred value of a is 1.2.

In the present disclosure, when the dynamic sub-pixels are RCB, $$LBg(255)=b*LBi(255),$$

wherein LBi (255) is a brightness value of gray level 255 output by the point B, and 0.5<b<2.

In the present disclosure, 1≤b≤1.3.

Preferably, b=1.2.

In the present disclosure, Xw=0.31, Yw=0.325, LRg (255) is 29.3 nits, and LCg (255) is 70.7 nits.

In the present disclosure, when the dynamic sub-pixels are YGB or YRB, output brightness of the point Y and that of the point B meet the following formula:

$$LYg(255)+LBg(255)=LRi(255)+LGi(255)+LBi(255) \quad (4)$$

$$Xw=[(XBg \times LBg/YBg)+(XYg \times LYg/YYg)]/(LBg/YBg+LYg/YYg) \quad (5)$$

$$Yw=(LBg+LYg)/(LBg/YBg+LYg/YYg) \quad (6)$$

wherein Xw and Yw are horizontal and vertical coordinates of the point W respectively; LRi (255), LGi (255), and LBi (255) are respectively an output brightness value when gray level 255 in red is input, an output brightness value when gray level 255 in green is input, and an output brightness value when gray level 255 in blue is input (that is, the brightness values of gray level 255 in red, green, and blue output by the graphene display device when the pixel has three primary colors of RGB); XBg and YBg are horizontal and vertical coordinates of the point B; XYg and YYg are horizontal and vertical coordinates of the point Y respectively; LYg (255) is a brightness value of gray level 255 output by the point Y; and LBg (255) represents a brightness value of gray level 255 output by the point B.

In some embodiments of the present disclosure, the graphene display device comprises a graphene display unit and a display control unit. The display control unit and the graphene display unit are electrically connected with each other, and the display control unit is used for controlling the graphene display unit to display corresponding color and brightness. The graphene display unit comprises a lower substrate, light emitting structures, a protective layer, a light shielding layer, and an upper substrate. The light emitting structures are located on one side surface of the lower substrate, and the protective layer covers the light emitting structures. The upper substrate covers the light emitting structures and the protective layer, and the light shielding layer is formed on one side surface of the upper substrate towards the lower substrate.

Both the lower substrate and the upper substrate are glass substrates, which also provide support for the graphene display unit while they are transmitting light. The lower substrate and the upper substrate can also use other transparent materials, such as polyethylene terephthalate (PET) or nickel and the like, and in addition, the materials of the lower substrate can be the same, and can also be different.

The number of the light emitting structures can be provided according to the specific requirements of the graphene display device. Each of the light-emitting structures comprises a light-emitting layer, a gate, a source, and a drain. The gate covers one side surface of the light-emitting layer towards the upper substrate, and the source and the drain are located on one side of the light-emitting layer away from the gate. The light emitting layer is a semi-reduced graphene oxide, the gate is graphene oxide, and the source and the drain are the reduced graphene oxide.

It has been demonstrated by experimental studies that in terms of a graphene display, the light emitting layer can emit light with different colors according to differences of gate voltages. For example, when the gate voltage Vgs is between 0 V and 10 V and a source-drain voltage Vds is greater than a startup voltage Vth, the light emitted by the light-emitting unit is red light; when Vgs is between 20 V and 30 V and the source-drain voltage Vds is greater than the startup voltage Vth, graphene emits green light; and when Vgs is between 40 V and 50 V and the source-drain voltage Vds is greater than the startup voltage Vth, graphene emits blue light. The intensity of the light emitted by the light-emitting unit can be changed by changing the size of the Vds voltage, and thereby a gray level can be adjusted.

Therefore, each light-emitting unit actually constitutes a dynamic pixel. A light-emitting color of the light-emitting unit can be adjusted by controlling a source-drain voltage Vds, and each light-emitting unit can emit not only red-green-blue (RGB) 3-primary color light, but also light with red-green-blue-yellow-cyan (RGBYC) 5 primary colors or even more colors. Therefore, a brighter and wider color gamut coverage can be realized; an aperture ratio of a display device can be increased; and the display power consumption can be reduced.

In some embodiments, one pixel of each of the graphene display units is constituted by three of the light-emitting units, and each of the light-emitting units is one dynamic sub-pixel of the pixel.

In some embodiments, one pixel of the graphene display unit is constituted by only one light-emitting unit, namely each pixel of each graphene display unit only has one dynamic sub-pixel. The aim of multi-primary-color full-color wide-color-gamut display can also be achieved according to a time sequence driving way.

Specifically, with 180 HZ time sequence driving for RGBYC 5 primary colors as an example, firstly, the color gamut of a pixel is divided in terms of time sequences, and each time sequence is matched with corresponding display colors of the dynamic sub-pixels of graphene.

The 3 primary colors as well as display colors and time sequences are determined according to an input pixel chromaticity coordinate A (x, y), and corresponding gate voltage Vgs and source-drain voltage Vds can be adjusted according to the display colors and the time sequences, so that time sequence multi-primary-color full-color driving can be realized.

By adjusting the brightness of three dynamic sub-pixels in different RGBYC 5-primary color triangular color gamuts, a graphene display device can have relatively good consistency in color coordinates of the white point, and the output brightness can be basically close to white chromaticity when the gray level values of input RGB three pixels are approximately the same in each triangular color patch where a point A is located, so that the consistency of the color coordinates of the white point is ensured.

The above technical features can be combined in any suitable way or be replaced with equivalent technical features as long as the aim of the present disclosure can be achieved.

BRIEF DESCRIPTION OF THE DRAWINGS

The present disclosure will be described in more detail hereinafter based on embodiments and with reference to drawings. In the drawings.

The drawings are not drawn according to the actual proportion.

DETAILED DESCRIPTION OF THE EMBODIMENTS

In order to better understand technical solutions in the present disclosure by those skilled in the art, the technical solutions in the embodiments of the present disclosure will be clearly and completely described hereinafter in conjunction with the drawings in the embodiments of the present disclosure. It is apparent that the described embodiments are only parts of embodiments of the present disclosure, but not all the embodiments. Based on the embodiments in the present disclosure, all other embodiments obtained on the premise that no creative labor is provided by those ordinary skilled in the art should fall into the scope of the present disclosure.

The present disclosure provides a display method of a multi-primary-color graphene display device, and the method comprises the steps of:

dividing a pixel color gamut to form a plurality of different color patches;

determining, according to an input pixel chromaticity coordinate, a color patch to which the pixel chromaticity coordinate belongs;

displaying through three dynamic sub-pixels according to the color patch to which the pixel chromaticity coordinate belongs, each color patch corresponding to display colors of three dynamic sub-pixels; and determining output brightness of the dynamic sub-pixels by coordinates of a white point, coordinates of the dynamic sub-pixels, an output brightness value when gray level 255 in red is input, an output brightness value when gray level 255 in green is input, and an output brightness value when gray level 255 in blue is input.

In a present embodiment, a color point Y is an intersection point of an extension line of a connection line of a color point B and a color point W with a light-emitting color curve of graphene, and a color point C is an intersection point of an extension line of a connection line of a color point R and the color point W with the light-emitting color curve of graphene.

In an RGB three-primary-color system, coordinates of RGB of the graphene display device are firstly defined (a color peak wavelength $W_P$ of the graphene display device can be adjusted through a threshold voltage Vg), and if the color coordinates of a white point are as follows: Xw=0.31, Yw=0.325, and all RGB are at gray level 255, then the brightness of RGB is respectively 20.6 nits, 75.2 nits, 4.2 nits. The $W_P$ and coordinates of RGB are described in table 1, and the brightness values of the RGB under the gray level 255 are described in table 2.

TABLE 1

Chromaticity coordinates and $W_P$ values.

| Pixel | Vg (V) | $W_P$ (nm) | Horizontal coordinate | Vertical coordinate |
|---|---|---|---|---|
| R | 0 | 650 | 0.7032 | 0.2967 |
| G | 25 | 530 | 0.2096 | 0.7037 |
| B | 45 | 450 | 0.1488 | 0.0339 |

TABLE 2

Brightness values of RGB

| Pixel | Gray level values | Brightness (nits) |
|---|---|---|
| R | 255 | 20.6 |
| G | 255 | 75.2 |
| B | 255 | 4.2 |
| Total brightness | | 100 |

In order to make an RGBYC 5-primary-color graphene display device have a good consistency in the chromaticity coordinates of the white points, the color point Y and the color point C are defined, wherein the color point Y is the intersection point of the extension line of the connection line of the color point B and the color point W with the light-emitting color curve of graphene, and the color point C is the intersection point of the extension line of the connection line of the color point R and the color point W with the light-emitting color curve of graphene.

In a rectangular plane coordinate system, the color gamut where RGBYC is located can be divided into five triangular color patches of WBR, WCB, WGC, WYG and WRY. The triangular color patches have a predetermined matching relationship with display colors of the dynamic sub-pixels, and each of the triangular color patches has the display color of a corresponding dynamic sub-pixel.

Figure 7:
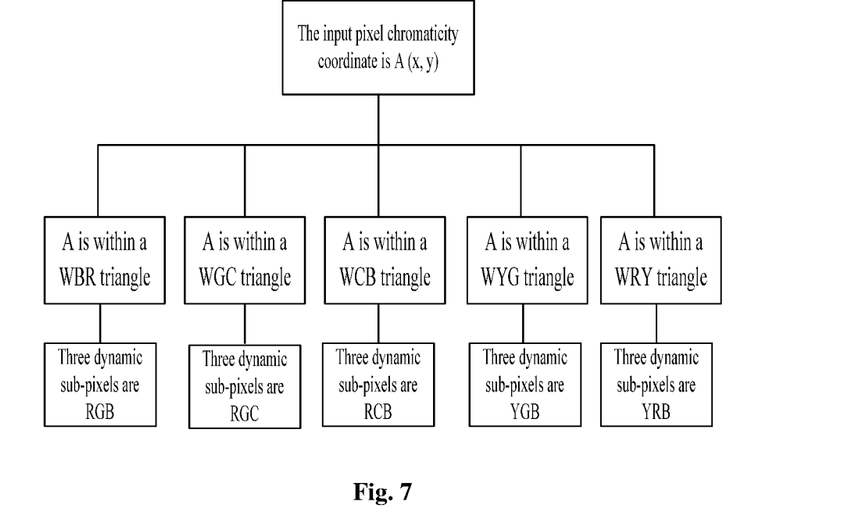
FIG. 7 shows a correspondence diagram of positions of a pixel chromaticity coordinate A (x, y) and display colors of dynamic sub-pixels in the detailed description of embodiments.
Figure 8:
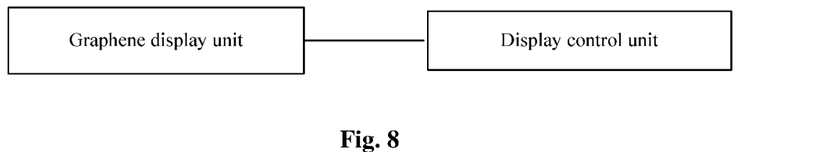
FIG. 8 shows a diagram of the graphene display device in the detailed description of embodiments.

A position of a pixel in the pixel color gamut can be determined according to an input pixel chromaticity coordinate A (x, y), and the display colors of the three dynamic sub-pixels can be determined according to the position of the pixel in the pixel color gamut. FIG. 7 is a correspondence diagram of the position of the pixel chromaticity coordinate A (x, y) and the display colors of the dynamic sub-pixels.

By adopting the above method, the ultra-wide color gamut display of 5 primary colors can be achieved utilizing three dynamic sub-pixels, so that the high color saturation is provided in display. And meanwhile, the number of the sub-pixels is reduced, so that the aperture ratio of the display device can be increased.

The graphene display device provided by the present embodiment comprises a graphene display unit and a display control unit. The display control unit is electrically connected with the graphene display unit and is used for controlling the graphene display unit to display corresponding colors with specific brightness.

The graphene display unit comprises a lower substrate, light-emitting structures, a protective layer, a light shielding layer, and an upper substrate. The light-emitting structures are located on a surface of one side of the lower substrate, and the protective layer covers the light-emitting structures. The upper substrate covers the light-emitting structures and the protective layer, and the light shielding layer is formed on one side surface of the upper substrate towards the lower substrate.

In the present embodiment, each of the lower substrate and the upper substrate is a glass substrate which provides support for the graphene display unit while transmitting light. It is understandable that the lower substrate and the upper substrate can also be made of other transparent materials such as polyethylene terephthalate (PET) or nickel in other embodiments. In addition, the upper substrate and the lower substrate can be made of the same material or different materials.

The number of the light-emitting structures can be set according to the specific requirement of the graphene display device. Each of the light-emitting structures comprises a light-emitting layer, a gate, a source, and a drain. The gate covers a surface of a side, facing the upper substrate, of the light-emitting layer, and the source and the drain are located at a side, facing away from the gate, of the light-emitting layer. In the present embodiment, the light-emitting layer is semi-reduced graphene oxide; the gate is graphene oxide; and the source and the drain are reduced graphene oxide.

Experiment researches prove that in terms of a graphene display device, the light-emitting layer can emit light with different colors according to differences of gate voltages. For example, when the gate voltage Vgs is between 0 V and 10 V and a source-drain voltage Vds is greater than a startup voltage Vth, the light-emitting unit emits red light; when Vgs is between 20 V and 30 V and the source-drain voltage Vds is greater than the startup voltage Vth, graphene emits green light; and when Vgs is between 40 V and 50 V and the source-drain voltage Vds is greater than the startup voltage Vth, graphene emits blue light. The intensity of the emitted light can be changed by changing the size of the voltage Vds, and thereby a gray level can be adjusted.

Therefore, each of the light-emitting structures actually constitutes a dynamic pixel, and adjustment of the light emitting color of the light emitting structures can be achieved by controlling the source-drain voltage Vds. And each of the light-emitting units can emit not only red-green-blue (RGB) 3-primary color light, but also light with red-green-blue-yellow-cyan (RGBYC) 5 primary colors or even more colors. Therefore, a brighter and wider color gamut coverage can be realized; an aperture ratio of a display device can be increased; and the display power consumption can be reduced.

One pixel of the graphene display unit can include three of the light-emitting units, and each of the light-emitting units is one dynamic sub-pixel of the pixel.

In addition, one pixel of each of the graphene display units can include only one of the light-emitting units, namely each pixel of each graphene display unit only has one dynamic sub-pixel. The aim of multi-primary-color full-color wide-color-gamut display can also be achieved according to the time sequence driving way.

Specifically, with 180 HZ time sequence driving for RGBYC 5 primary colors as an example, firstly, the color gamut of a pixel is divided in terms of time sequences, and each time sequence is matched with corresponding display colors of the dynamic sub-pixels of graphene.

The three primary colors as well as display colors and time sequences are determined according to an input pixel chromaticity coordinate A (x, y), and corresponding gate voltages Vgs and source-drain voltages Vds can be adjusted according to the display colors and the time sequences, so that time sequence multi-primary-color full-color driving can be realized.

Every second is divided into a plurality of equal parts according to time sequences, and the gate voltage Vgs and the source-drain voltage Vds are adjusted within each divided time sequence according to corresponding display colors. Colors displayed by three adjacent time sequences constitute three primary colors. The gate voltage Vgs and the source-drain voltage Vds are controlled according to input of the time sequence, to display a first color at a preset gray level. During a next time sequence, the gate voltage Vgs and the source-drain voltage Vds are controlled according to input of the time sequence, to display a second color at a preset gray level. During a subsequent time sequence, the gate voltage Vgs and the source-drain voltage Vds are controlled according to input of the time sequence, to display a third color at a preset gray level. The light of the three time sequences can be visually mixed to form light with a predetermined color.

Therefore, the aim of multi-primary-color full-color wide-color-gamut display realized by virtue of single dynamic sub-pixel in one pixel is achieved, and the display device can be used for reducing the number of pixels in the graphene display units, increasing the aperture ratio, and reducing the display power consumption. In such a driving way for the display device, the number of the pixels in the graphene display units can be further reduced; the aperture ratio can be increased; and the display power consumption can be reduced.

The protective layer is used for protecting the light-emitting structures and preventing water, gases and other impurities from invading to damage the light-emitting structures.

The light-emitting structures are made of silicon dioxide ($SiO_2$).

The light shielding layer is used for preventing background light from leaking, so as to improve color display contrast, avoid color mixing, and increase color purity. The light shielding layer is a non-transparent part located among the light-emitting structures and corresponds to the light-emitting structures, and the light shielding layer is provided with a through light-transmitting window to ensure that the light shielding layer is distributed in a matrix shape, so that the light shielding layer is also called a black matrix layer. Optionally, the light shielding layer is a chromium material layer deposited on a surface of the upper substrate, and specifically, a chromium layer is firstly formed on a second transparent substrate by sputtering, and then, the light-transmitting window is formed by etching by using a photo etching method. In addition, the light shielding layer can also be prepared from a resin photoresist containing a black dye by using the photo etching method.

The graphene display device also comprises a reflecting layer formed on the surface of the side, facing away from the light-emitting structures, of the lower substrate. The reflecting layer can reflect light emitted by the light-emitting structures, so that the utilization ratio of rays is increased.

Preferably, the reflecting layer is made of a high-reflectivity metal material.

The display control unit is used for controlling the dynamic sub-pixels of the graphene display unit to implement corresponding display according to the input gray level value of an RGB pixel and the pixel chromaticity coordinate.

With three dynamic sub-pixels to achieve 5-primary color display as an example, the display control unit is required to divide a pixel color gamut at first, i.e., to divide the pixel color gamut into five triangular color patches, and match corresponding pixel chromaticity coordinate and the display color.

In particular, in a rectangular plane coordinate system, the pixel color gamut is divided into five triangular color patches of WBR, WCB, WGC, WYG, and WRY. Each of the triangular color patches corresponds to colors displayed by the dynamic pixels, and the pixel chromaticity coordinate is marked A (x, y). When the pixel chromaticity coordinate falls into a corresponding triangular color patch, the display control unit controls the dynamic sub-pixels to display corresponding colors, furthermore achieving the 5-primary color display carried out by three dynamic sub-pixels.

In the case of one dynamic sub-pixel to achieve 5-primary color display, the display control unit performs a time sequence division on the pixel color gamut at first. Each time sequence is matched with corresponding display colors of the graphene dynamic sub-pixels. The display control unit performs a color conversion according to the input RGB pixel gray level value RiGiBi and the pixel chromaticity coordinate A (x, y) and determines the display colors and the time sequences, and the drain-source voltage Vds and the gate voltage Vgs corresponding to the time sequences are selected to perform color and brightness display. In order to guarantee the consistency of the chromaticity coordinates of the white point, when the input gray level values of the RGB three pixels are close to the same, the output brightness of the dynamic sub-pixels is determined by a coordinate of a white point, coordinates of the dynamic sub-pixels, an output brightness value when gray level 255 in red is input, an output brightness value when gray level 255 in green is input, and an output brightness value when gray level 255 in blue is input.

The graphene display device can achieve multi-primary color display with a less number of pixels by driving the dynamic pixel, thus achieving a brighter and wider color gamut coverage, an improved aperture ratio, and reduced power consumption.

Figure 9:
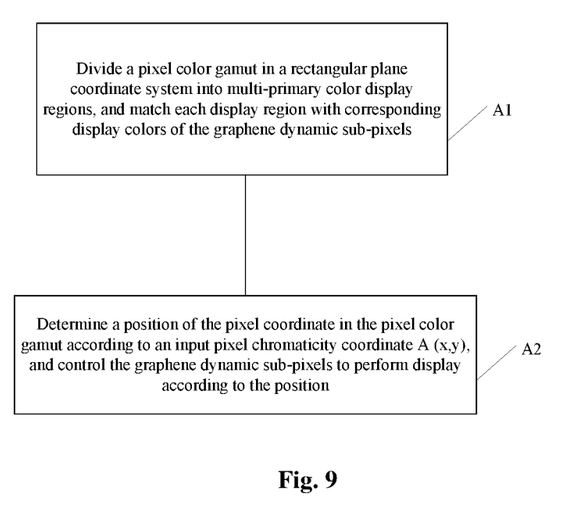
FIG. 9 shows a flow chart of multi-primary-color display realized by adopting three graphene dynamic sub-pixels in the detailed description of embodiments.

FIG. 9 shows a flow chart of multi-primary color display realized by adopting three graphene dynamic sub-pixels specifically, and the flow chart includes the following steps.

In step A1, a pixel color gamut in a rectangular plane coordinate system is divided into multi-primary color display regions, and each display region is matched with corresponding display colors of graphene dynamic sub-pixels.

Specifically, in the rectangular plane coordinate system, the pixel color gamut is divided into five triangular color patches of WBR, WCB, WGC, WYG, and WRY. The triangular color patches have a predetermined matching relationship with the display colors of the dynamic sub-pixels, and each of the triangular color patches has the corresponding display colors of the dynamic sub-pixels.

In step A2, a position of the pixel coordinate in the pixel color gamut is determined according to an input pixel chromaticity coordinate A (x, y), and the graphene dynamic sub-pixels perform display under control according to the position. In order to guarantee the consistency of the chromaticity coordinates of the white point, when the input gray level values of the RGB three pixels are close to the same, the output brightness of the dynamic sub-pixels is determined by the coordinate of a point W, namely a white point, the coordinates of the dynamic sub-pixels, an output brightness value when gray level 255 in red is input, an output brightness value when gray level 255 in green is input, and an output brightness value when gray level 255 in blue is input.

By adopting the above method, the ultra-wide color gamut display of 5 primary colors can be achieved utilizing three dynamic sub-pixels, so that the display has a high color saturation, and the number of the sub-pixels is reduced at the same time, thereby improving aperture ratio of the display device.

Figure 10:
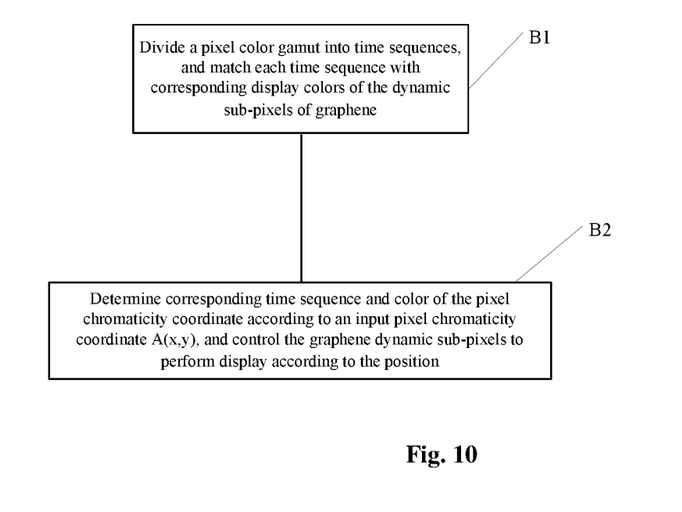
FIG. 10 shows a flow chart of multi-primary-color display realized by adopting one graphene dynamic sub-pixel in the detailed description of embodiments.

FIG. 10 shows a flow chart of multi-primary color display realized by adopting one graphene dynamic sub-pixel, and the flow chart includes the following steps.

In step B1, a pixel color gamut is divided into time sequences, and each time sequence is matched with corresponding display colors of the graphene dynamic sub-pixels.

With a 180 HZ time sequence drive as an example, every second is divided into 180 equal parts according to time sequences. The gate voltage Vgs and the source-drain voltage Vds are adjusted according to the corresponding display color within each of the divided time sequences. The colors displayed by three adjacent time sequences constitute 3 primary colors. For example, at $1/180$ second, the gate voltage Vgs and the source-drain voltage Vds are controlled according to the input of the time sequence to display a first color at a preset gray level; at $2/180$ second, the gate voltage Vgs and the source-drain voltage Vds are controlled according to the input of the time sequence to display a second color at a preset gray level; and at $3/180$ second, the gate voltage Vgs and the source-drain voltage Vds are controlled according to the input of the time sequence to display a third color at a preset gray level. The light of the three time sequences can be visually mixed to form light with a predetermined color.

In step B2, corresponding time sequence and color of the pixel chromaticity coordinate are determined according to an input pixel chromaticity coordinate A (x, y), and the graphene dynamic sub-pixels perform display under control according to the position. In order to guarantee the consistency of the chromaticity coordinates of the white point, when the input gray level values of the RGB three pixels are close to the same, the output brightness of the dynamic sub-pixels is determined by the coordinate of a point W, namely a white point, the coordinates of the dynamic sub-pixels, an output brightness value when gray level 255 in red is input, an output brightness value when gray level 255 in green is input, and an output brightness value when gray level 255 in blue is input.

In the present embodiment, when the dynamic sub-pixels are YGB or YRB, output brightness of a point R and that of a point C meet the following formula:

$$LRg(255)+LCg(255)=LRi(255)+LGi(255)+LBi(255) \qquad (1)$$

$$Xw=[(XRg \times LRg/YRg)+(XCg \times LCg/YCg)]/(LRg/YRg+LCg/YCg) \qquad (2)$$

$$Yw=(LRg+LCg)/(LRg/YRg+LCg/YCg) \qquad (3)$$

wherein $X_w$ and Yw are horizontal and vertical coordinates of the point W respectively; LRi (255), LGi (255), and LBi (255) are respectively an output brightness value when gray level 255 in red is input, an output brightness value when gray level 255 in green is input, and an output brightness value when gray level 255 in blue is input; XRg and YRg are horizontal and vertical coordinates of the point R respectively; XCg and YCg are horizontal and vertical coordinates of the point C respectively; LCg (255) is a brightness value of gray level 255 output by the point C; and LRg (255) represents a brightness value of gray level 255 output by the point R.

In the present embodiment, when the dynamic sub-pixels are RGC, $$LGg(255)=a*LGi(255),$$

wherein LGg (255) is a brightness value of gray level 255 output by a point G, and 0.5<a<2.

In the present embodiment, 1≤a≤1.3.

A preferred value of a is in the range from 1 to 1.3, and a most preferred value of a is 1.2.

In the present embodiment, when the dynamic sub-pixels are RCB, $$LBg(255)=b*LBi(255),$$

wherein LBi (255) is a brightness value of gray level 255 output by a point B, and 0.5<b<2.

In the present embodiment, 1≤b≤1.3.

A preferred value of b is in the range from 1 to 1.3, and a most preferred value of b is 1.2.

In the present embodiment, Xw=0.31, Yw=0.325, LRg (255) is 29.3 nits, and LCg (255) is 70.7 nits.

In the present embodiment, when the dynamic sub-pixels are YGB or YRB, output brightness of a point Y and that of a point B meet the following formula:

$$LYg(255)+LBg(255)=LRi(255)+LGi(255)+LBi(255) \quad (4)$$

$$Xw=[(XBg \times LBg/YBg)+(XYg \times LYg/YYg)]/(LBg/YBg+LYg/YYg) \quad (5)$$

$$Yw=(LBg+LYg)/(LBg/YBg+LYg/YYg) \quad (6)$$

wherein Xw and Yw are horizontal and vertical coordinates of a point W respectively; LRi (255), LGi (255) and LBi (255) are respectively an output brightness value when gray level 255 in red is input, an output brightness value when gray level 255 in green is input, and an output brightness value when gray level 255 in blue is input; XBg and YBg are horizontal and vertical coordinates of the point B respectively; XYg and YYg are horizontal and vertical coordinates of the point Y respectively; LYg (255) is a brightness value of gray level 255 output by the point Y; and LBg (255) represents a brightness value of gray level 255 output by the point B.

In the present embodiment, Xw=0.31, Yw=0.325, LBg (255) is 4.6 nits, and LYg (255) is 95.4 nits.

It is evident to those skilled in the art that the present disclosure is not limited to the details of the foregoing illustrative embodiments, and that the present disclosure can be embodied in other specific forms without departing from the spirit or essential features of the present disclosure. Therefore, no matter from which point it is viewed, the embodiments should be viewed to be illustrative but not restrictive. The scope of the present disclosure is defined by the appended claims rather than by the foregoing description, and therefore all changes falling within the meaning and range of equivalents of the claims are intended to be embraced within the present disclosure.

Although the present disclosure has been described herein with reference to specific embodiments, it should be understood that these embodiments are merely illustrative of the principles and applications of the present disclosure. Thus it should be understood that numerous modifications may be made to the illustrative embodiments and that other arrangements may be devised, without departing from the spirit and scope of the present disclosure defined by the appended claims. It should be understood that the different dependent claims and the features described herein may be combined in a manner different from that described in the original claims. It can also be understood that the features described in combination with separate embodiments may be used in other embodiments.

LIST OF REFERENCE NUMBERS 1. source;
2. gate;
3. light-emitting layer;
4. drain;
5. lower substrate;
6. upper substrate; and
7. reflecting layer.

The invention claimed is:

1. A display method of a multi-primary color graphene display device, wherein the method comprises the steps of:
dividing a pixel color gamut to form a plurality of different color patches;
determining, according to an input pixel chromaticity coordinate, a color patch to which the input pixel chromaticity coordinate belongs;
displaying through three dynamic sub-pixels according to the color patch to which the input pixel chromaticity coordinate belongs, each color patch of the plurality of different color patches corresponding to display colors of the three dynamic sub-pixels; and
determining output brightness of the three dynamic sub-pixels by coordinates of a white point, coordinates of the three dynamic sub-pixels, an output brightness value when gray level 255 in red is input, an output brightness value when gray level 255 in green is input, and an output brightness value when gray level 255 in blue is input;
a color point Y is an intersection point of an extension line of a connection line of a color point B and a color point W with a light-emitting color curve of graphene, and a color point C is an intersection point of an extension line of a connection line of a color point R and the color point W with a light-emitting color curve of graphene; and
wherein the pixel color gamut is divided into five triangular color patches of WBR, WCB, WGC, WYG, and WRY, and each of the triangular color patches has corresponding display colors of three dynamic sub-pixels;
when the dynamic sub-pixels are RGC or RCB, output brightness of the point R and that of the point C meet the following formula:

$$LRg(255)+LCg(255)=LRi(255)+LGi(255)+LBi(255) \quad (1)$$

$$Xw=[(XRg \times LRg/YRg)+(XCg \times LCg/YCg)]/(LRg/YRg+LCg/YCg) \quad (2)$$

$$Yw=(LRg+LCg)/(LRg/YRg+LCg/YCg) \quad (3)$$

wherein Xw and Yw are horizontal and vertical coordinates of the point W respectively; LRi (255), LGi (255), and LBi (255) are respectively an output brightness value when gray level 255 in red is input, an output brightness value when gray level 255 in green is input, and an output brightness value when gray level 255 in blue is input; XRg and YRg are horizontal and vertical coordinates of the point R respectively; XCg and YCg are horizontal and vertical coordinates of the point C respectively; LCg (255) is a brightness value of gray level 255 output by the point C; and LRg (255) represents a brightness value of gray level 255 output by the point R.

2. The method according to claim 1, wherein when the dynamic sub-pixels are RGC, $$LGg(255)=a*LGi(255),$$

wherein LGg (255) is a brightness value of gray level 255 output by a point G, and 0.5<a<2.

3. The method according to claim 2, wherein 1<a<1.3.

4. The method according to claim 3, wherein a is 1.2.

5. The method according to claim 1, wherein when the dynamic sub-pixels are RCB, $$LBg(255)=b*LBi(255),$$

wherein LBi (255) is a brightness value of gray level 255 output by the point B, and 0.5<b<2.

6. The method according to claim 5, wherein 1<b<1.3.

7. The method according to claim 6, wherein b=1.2.

8. The method according to claim 1, wherein Xw=0.31, Yw=0.325, LRg (255) is 29.3 nits, and LCg (255) is 70.7 nits.

9. A display method of a multi-primary color graphene display device, wherein the method comprises the steps of:
dividing a pixel color gamut to form a plurality of different color patches;
determining, according to an input pixel chromaticity coordinate, a color patch to which the input pixel chromaticity coordinate belongs;
displaying through three dynamic sub-pixels according to the color patch to which the input pixel chromaticity coordinate belongs, each color patch of the plurality of different color patches corresponding to display colors of the three dynamic sub-pixels; and
determining output brightness of the three dynamic sub-pixels by coordinates of a white point, coordinates of the three dynamic sub-pixels, an output brightness value when gray level 255 in red is input, an output brightness value when gray level 255 in green is input, and an output brightness value when gray level 255 in blue is input;
a color point Y is an intersection point of an extension line of a connection line of a color point B and a color point W with a light-emitting color curve of graphene, and a color point C is an intersection point of an extension line of a connection line of a color point R and the color point W with a light-emitting color curve of graphene; and wherein the pixel color gamut is divided into five triangular color patches of WBR, WCB, WGC, WYG, and WRY, and each of the triangular color patches has corresponding display colors of three dynamic sub-pixels; wherein when the dynamic sub-pixels are YGB or YRB, output brightness of the point Y and that of the point B meet the following formula:

$$LYg(255)+LBg(255)=LRi(255)+LGi(255)+LBi(255) \qquad (4)$$

$$Xw=[(XBg \times LBg/YBg)+(XYg \times LYg/YYg)]/(LBg/YBg+LYg/YYg) \qquad (5)$$

$$Yw=(LBg+LYg)/(LBg/YBg+LYg/YYg) \qquad (6)$$

wherein Xw and Yw are horizontal and vertical coordinates of the point W respectively; LRi (255), LGi (255), and LBi (255) are respectively an output brightness value when gray level 255 in red is input, an output brightness value when gray level 255 in green is input, and an output brightness value when gray level 255 in blue is input; XBg and YBg are horizontal and vertical coordinates of the point B respectively; XYg and YYg are horizontal and vertical coordinates of the point Y respectively; LYg (255) is a brightness value of gray level 255 output by the point Y; and LBg (255) represents a brightness value of gray level 255 output by the point.

10. The method according to claim 9, wherein Xw=0.31, Yw=0.325, LBg (255) is 4.6 nits, and LYg (255) is 95.4 nits.

* * * * *